United States Patent [19]

Horyu

[11] Patent Number: 4,972,501
[45] Date of Patent: Nov. 20, 1990

[54] IMAGE PROCESSING APPARATUS
[75] Inventor: Sakae Horyu, Hachiohji, Japan
[73] Assignee: Canon Kabushiki Kaisha, Tokyo, Japan
[21] Appl. No.: 474,300
[22] Filed: Feb. 5, 1990

Related U.S. Application Data

[63] Continuation of Ser. No. 112,059, Oct. 26, 1987, abandoned, which is a continuation of Ser. No. 706,178, Feb. 27, 1985, abandoned.

[30] Foreign Application Priority Data

| Mar. 1, 1984 | [JP] | Japan | 59-39086 |
| Mar. 7, 1984 | [JP] | Japan | 59-41884 |
| Mar. 7, 1984 | [JP] | Japan | 59-41885 |

[51] Int. Cl.⁵ ............................. G06K 9/38
[52] U.S. Cl. .......................... 382/53; 382/50; 434/112; 434/113; 434/114
[58] Field of Search ............... 307/351; 324/433, 435, 324/426; 340/407, 825.19; 382/1, 50, 52, 53, 59; 434/112–114, 116; 358/465, 466

[56] References Cited

U.S. PATENT DOCUMENTS

| 2,866,279 | 12/1958 | Surber | 434/114 |
| 4,143,358 | 3/1979 | Neff | 382/50 |
| 4,290,109 | 9/1981 | Taniguchi et al. | 324/433 |
| 4,334,280 | 6/1982 | McDonald | 340/707 |
| 4,402,087 | 8/1983 | Sakamoto et al. | 382/53 |
| 4,442,544 | 4/1984 | Moreland et al. | 382/53 |
| 4,446,486 | 5/1984 | Itoh | 382/53 |
| 4,468,704 | 8/1984 | Stoffel et al. | 382/53 |
| 4,525,747 | 6/1985 | Sakai et al. | 382/52 |
| 4,584,703 | 4/1986 | Hallberg | 382/50 |
| 4,594,733 | 6/1986 | Kanzai et al. | 382/50 |
| 4,644,410 | 2/1987 | Schlichtig | 382/53 |
| 4,689,691 | 8/1987 | Isogai et al. | 358/280 |
| 4,691,239 | 9/1987 | Nelson et al. | 382/53 |
| 4,701,807 | 10/1987 | Ogino | 382/50 |
| 4,709,274 | 11/1987 | Tanioka | 382/50 |

OTHER PUBLICATIONS

Sensory Aids Corporation, "Museum Accommodations for Visually Impaired People", Journal of Visual Impairment & Blindness, Sep. 1983, vol. 77, No. 7, 9/1983.

Primary Examiner—David K. Moore
Assistant Examiner—Jose L. Couso
Attorney, Agent, or Firm—Fitzpatrick, Cella, Harper & Scinto

[57] ABSTRACT

An image processing apparatus for reading an image pattern such as characters, graphics or the like written on a printed matter comprises: a lamp for illuminating such an image pattern; a photo-sensor as an image reading unit for converting the light reflected from the pattern to an electrical signal as multi-value digital data; a converter for converting the output data from the photo-sensor to a binary digital value on the basis of the maximum value and the minimum value of this data; and a control unit for controlling the photo-sensor so as to stabilize the binary output data from the converter on the basis of this output data. With this apparatus, the image pattern is converted to the mechanical vibrational pattern or enlarged display pattern due to the piezoelectric elements or LEDs, thereby enabling a blind person or person with poor vision to easily and certainly perceive the characters or graphic information on the printed matter.

11 Claims, 12 Drawing Sheets

IMAGE PROCESSING APPARATUS

This application is a continuation of application Ser. No. 112,059 filed Oct. 26, 1987, now abandoned, which is a continuation of application Ser. No. 706,178 filed Feb. 27, 1985, now abandoned.

BACKGROUND OF THE INVENTION

1. Field of the Invention

The present invention relates to an image processing apparatus or the like which reads an image such as a character or the like on a printed matter and converts to another signal pattern.

The present invention relates to an apparatus for informing a fluctuation in power source voltage which can be applied to an image processing apparatus such as a pattern converting apparatus or the like that enables a blind person to read a printed matter on which ordinary characters were written.

The present invention relates to an image processing apparatus and, more particularly, to a pattern converting apparatus which converts graphic information that was read out to a mechanical vibrational pattern or to an enlarged display pattern, thereby enabling a blind person or person with poor vision to easily perceive the graphic information.

2. Description of the Prior Art

Hitherto, as an example of image processing apparatuses, particularly, as a pattern converting apparatus which is used to allow a blind person or person with poor vision to perceive a printed matter represented by ordinary characters, an apparatus as shown in a perspective view of FIG. 1 has been known. This apparatus mainly comprises: a camera apparatus 10 for converting image information on the printed matter to an electrical signal; a control unit (not shown) for transmitting a control signal to a tactile output apparatus 11 to output the image information as a mechanical vibrational pattern; and a main body 12 having therein an electric power supply unit (not shown) to supply power to each unit.

The camera apparatus 10 scans on characters 14 printed on a paper 13 manually or by another driving apparatus in the row direction, namely, in the direction indicated by an arrow a or b. An image of the characters 14 which are inputted in correspondence to a reading unit 15 is transmitted to a photoelectric converting unit 16 through the camera apparatus 10 having an optical system therein. This image signal is processed as black and white states corresponding to 144 points like a matrix of 6×24 and is converted into an electrical signal by the photoelectric converting unit 16. This electrical signal is inputted to the main body 12 through a cable 17.

On one hand, the tactile output apparatus 11 is attached to a part of the main body 12 and is formed with holes 19 in a curved surface 18 of the main body in a manner such that 144 small metal rods (sticks) arranged in a matrix of 6×24 corresponding to the 144 points of the photoelectric converting unit 16 can protrude through the holes 19, respectively. These rods are constituted in a manner such that they are driven due to piezoelectric elements or small-sized electromagnets and the rods can be respectively and individually vibrated in the holes 19 in response to the electrical signal from the camera apparatus 10.

With respect to the electrical signals corresponding to the 144 points obtained by the camera apparatus 10, threshold values are properly set, thereby obtaining the binary signals. Namely, each binary signal corresponds to the black or white state of each of those 144 points and, for instance, this signal instructs the vibration in case of the black state and the non-vibration in case of the white state. The foregoing rods can form a vibrational pattern represented by the vibrational distribution of the metal rods on the curved surface 18 of the tactile output apparatus 11 in dependence upon the foregoing binary signals. Namely, the characters 14 on the paper 13 read out by the camera apparatus 10 are converted and outputted as the mechanical vibrational pattern on the curved surface 18 of the tactile output apparatus 11. By pressing a finger or another part of the body which can sense the mechanical stimulus to come into contact with the curved surface 18, it is possible to read the characters 14 written on the paper 13 corresponding to the reading unit 15 of the camera apparatus 10 through the mechanical vibrational stimulus on the curved surface 18 of the tactile output apparatus 11.

In addition, the camera apparatus 10 is equipped with a zoom lens system so that in the case where sizes of the characters on the paper 13 corresponding to the reading unit 15 are small, they can be enlarged and projected onto the photoelectric converting unit 16, while in case of large characters, they can be reduced and projected. This zoom system can be operated with a knob 20.

A knob 21 provided for the main body 12 is used to adjust the strength of the vibration of each rod of the tactile output apparatus 11, namely, the intensity of the stimulus that is obtained on the curved surface 18. This intensity may be appropriately adjusted with this knob 21 in accordance with the sensitivity of the finger.

A knob 22 is used to control the boundary voltage when the electrical signal derived in the photoelectric converting unit 16 is converted into a binary digital signal by the comparator. The boundary voltage is properly adjusted by controlling the knob 22 in accordance with the black and white contrast of the paper 13 and characters 14 or with the overall black and white tone. However, an output of the sensor varies in a wide range in dependence upon the color or gloss of the paper 13, brightness of the lamp in the camera apparatus 10, position of the lens, etc. Therefore, although an output of the comparator also variably changes in association with the change of the boundary voltage by the knob 22, it is extremely difficult to determine the boundary voltage to become the optimum voltage level because a blind person or a person with poor vision cannot grasp the pattern of the characters or the like on the paper. Consequently, it takes a fairly long training time until the blind person or person with poor vision can satisfactorily utilize this apparatus.

On the other hand, it is desirable that the photoelectric converting means consisting of a photosensor, lamp and the like for use in such an apparatus always generates the stable output without being affected by the noise or the like. FIG. 2 is a graph showing the characteristic of a charge storage type photo-sensor. This graph shows the relation between the change in illuminance on a matter to be read and the output of the photo-sensor. In this graph, a curve a indicates the characteristic when the sensor scans the white portions of the paper, while a curve b represents the characteristic when the sensor scans the black portions of the paper. According to the graph, the outputs of the photo-sensor in the white portions and black portions of the paper largely differ with an increase an illuminance; however, when the illuminance increases and reaches a point C, it is saturated and the difference contrarily decreases and finally becomes zero. It is preferable that the difference between the curves a and b is large in consideration of the influence of the noise or the like, or of the circuit operation or the like. On the other hand, when the paper is glossy, the amount of reflected light into the sensor increases. In this case, the voltage which is applied to the lamp cannot be set to a high voltage level in terms of the characteristic at the point C. Also, when the voltage that is applied to the lamp is always constant, the operating point is shifted toward a point A in the diagram (in the direction indicated by an arrow) due to the time change of the sensor or lamp.

A voltage checker which is used in this apparatus generates different sounds by changing the frequency which is applied to the piezoelectric element. However, it is necessary to perform not only the work to change over the switch when the voltage is checked but also the work to discriminate the deviation of the sound or frequency of the vibrating member. Therefore, in the case where the apparatus is used at the outdoor location or the like or in other cases, the user has to always pay attention to checking the power source to prevent loss of voltage capacity of the battery. Furthermore, since the number of operating switches increases, problems in both operation and designing are also caused. In addition, in case of discriminating on the basis of a degree of sense in auditory sense or tactual sense, namely, due to whether the stimulus is the same or not, accurate discrimination cannot be expected.

SUMMARY OF THE INVENTION

The present invention is made in consideration of the foregoing points and intends to provide a pattern converting apparatus in which the boundary voltage is automatically determined due to the maximum and minimum values of the graphic information which was read out, thereby enabling this read-out graphic information to be certainly perceived even if the user is unfamiliar with the operation.

The present invention is provided in consideration of the foregoing problems of the conventional technology and an object of the invention is to provide a pattern converting apparatus which can always automatically operate at the optimum operating point.

The present invention is provided in consideration of the foregoing problems of the conventional technology and an object of the invention is to provide an apparatus for forming a fluctuation in power source voltage in which when the voltage of the battery reaches a predetermined voltage level, a warning is automatically generated and the operability is improved.

DESCRIPTION OF THE PREFERRED EMBODIMENTS

The present invention will now be described in detail hereinbelow with reference to the drawings. The case where a quantity of light of a lamp is controlled using the difference between the maximum value and the minimum value of the intensity of the light will be first explained.

Figure 1:
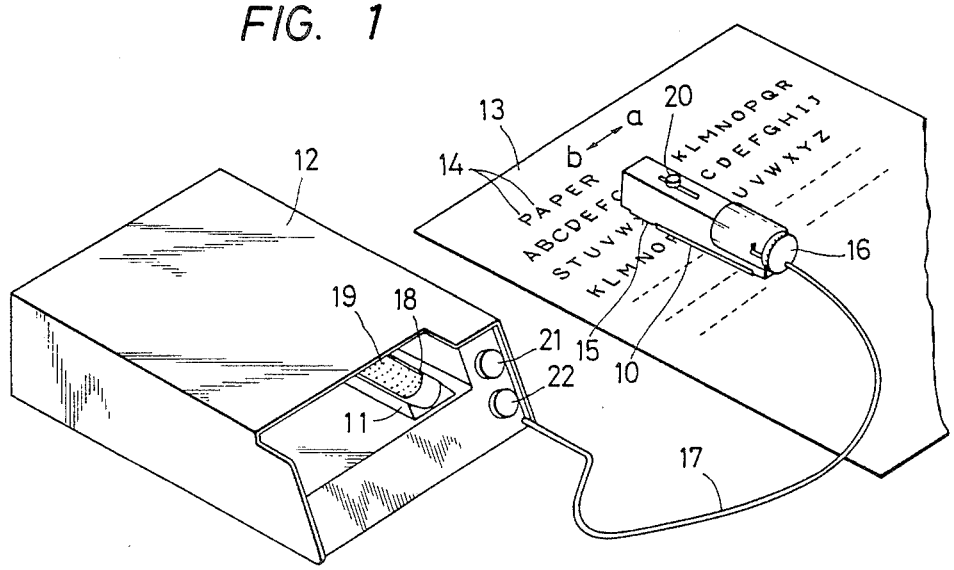
FIG. 1 is a perspective view illustrating an apparatus to which one example of the present invention is applied.
Figure 3:
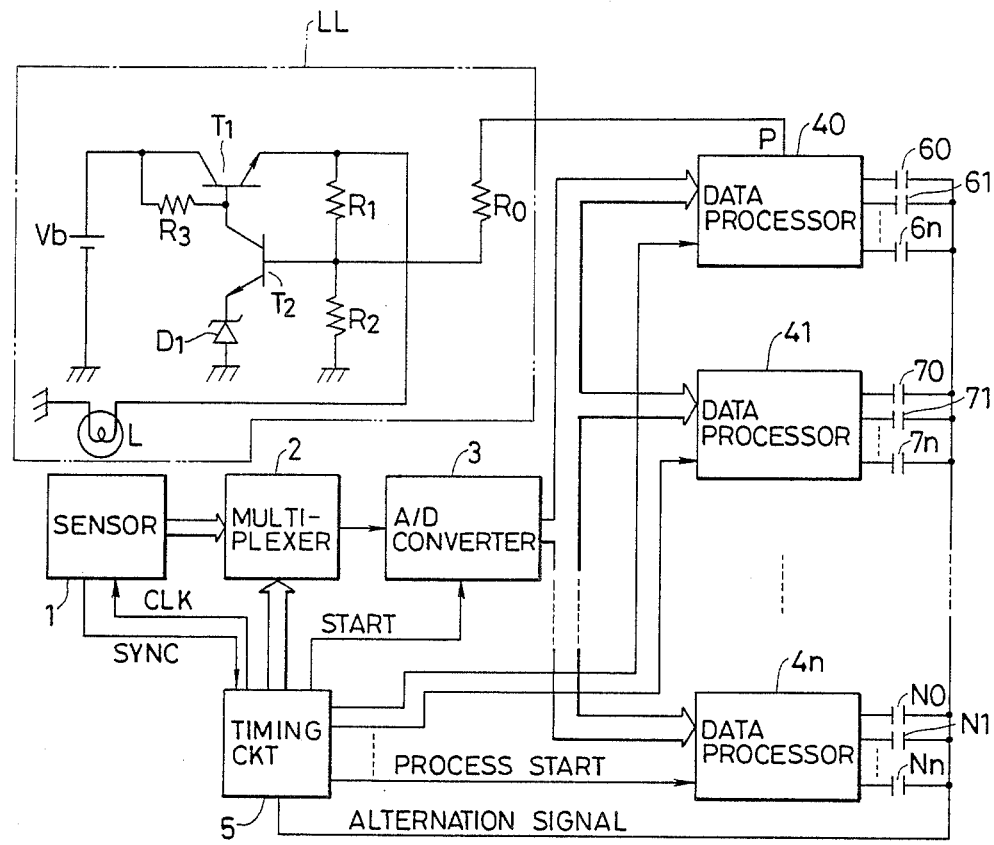
FIG. 3 is a block diagram showing one embodiment of the present invention.
Figure 4:
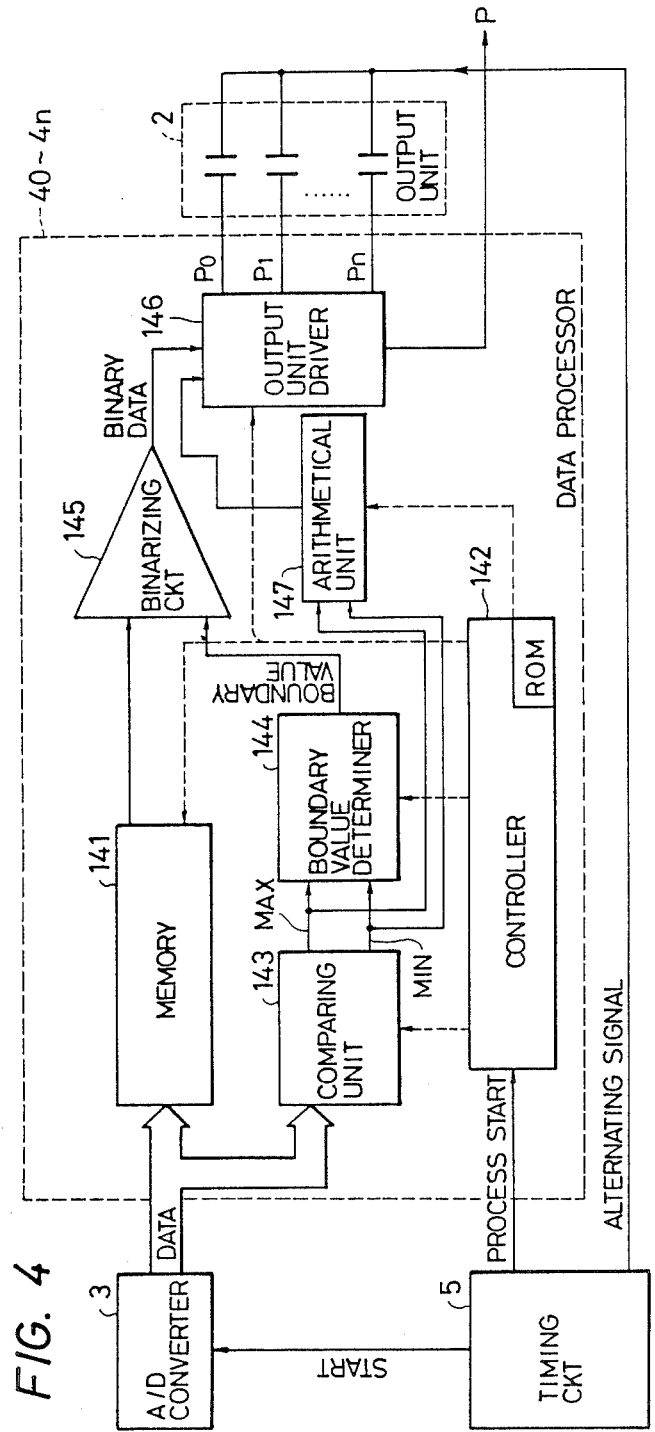
FIG. 4 is a block diagram showing the details of a data processing unit.
Figure 5:
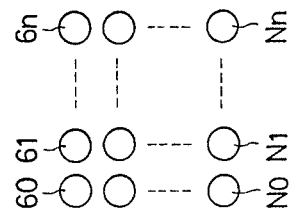
FIG. 5 is a diagram showing an arrangement example of an output unit of the embodiment.

FIG. 3 is a block diagram of a pattern converting apparatus of one embodiment of the present invention. FIG. 4 is a detailed explanatory diagram of a data processing unit shown in FIG. 3. FIG. 5 shows an arrangement example of an output unit. In the drawings, a reference numeral 1 denotes a photo-sensor of the MOS type, CCD type or the like (which corresponds to the camera apparatus 10 in FIG. 1). Although not shown, the sensor 1 is constituted by sensor-0, sensor-1, ..., sensor-n A numeral 2 is a multiplexer to convert output signals of the sensor 1 which are outputted in parallel into a series signal. This multiplexer is unnecessary in case of using a sensor which outputs a signal in series. A numeral 3 is an analog-to-digital (A/D) converter for converting an analog signal from the sensor to a digital signal; and $4_0$ to $4n$ represent data processing units which process the digital signal from the A/D converter 3 and generate output patterns corresponding to output units $6_0$ to $6n$, $7_0$ to $7n$, ..., $N_o$ to $N_n$.

A timing circuit 5 supplies a clock pulse to the sensor 1. Synchronously with a sync signal SYNC from the sensor 1, the timing circuit 5 supplies a channel changeover signal to the multiplexer 2 and supplies a start signal to the A/D converter 3. Also, the timing circuit 5 sequentially supplies only every n process start signals as many as the number of sensor elements of one column of the sensor 1 to the data processing units $4_0$ to $4n$ in order to start the readin and data processes synchronously with the digital signal outputs from the A/D converter 3. Numerals $6_0$–$6n$, $7_0$–$7n$, and $N_0$–$N_n$ represent the perceptual pattern output apparatuses consisting of, for instance, piezoelectric elements or the like. In the case where these output apparatuses consist of the piezoelectric elements, they correspond to the tactile output apparatus 11 in FIG. 1 and vibrate in response to an alternating signal from the timing circuit 5, thereby transferring the vibrations to the small metal rods. The parallel outputs from the sensor 1 are respectively inputted to the data processing units $4_0$ to $4n$ on a column by column basis, so that the states of the respective sensor elements are outputted to the output units $6_0$–$6_n$, $7_0$–$7_n$, ..., and $N_0$–$N_n$ on a column by column basis.

FIG. 4 shows the details of the data processing units $4_0$–$4_n$, which the data processing units $4_0$–$4_n$ have in common.

In the diagram, a reference numeral 141 denotes a memory to store the digital information from the A/D converter 3; 142 is a controller to control the overall data processing units and this controller has a ROM in which a control flowchart or the like which will be mentioned later has been stored; 143 a comparing unit to detect the maximum value and the minimum value of the storage data from the A/D converter 3 into the memory 141; 144 a boundary value determiner to determine the boundary value from the maximum and minimum values derived in the comparing unit 143; 145 a binarizing circuit to binarize the digital information stored in the memory 141 using the boundary value from the boundary value determiner 144 as a reference; 146 an output unit driver for serial-parallel converting the binarized digital signal from the binarizing circuit 145 and thereby to drive the corresponding output units 6; and 147 an arithmetical unit, which will be explained in detail later.

The data processing control of the data processing units having the foregoing arrangement will then be described with reference to a flowchart of FIG. 6. This flowchart has been stored in the ROM in the control unit shown in FIG. 4.

First, the value (of a counter) is cleared in step S1 and the digital information ($D_n$) from the A/D converter 3 is received synchronously with the process start signal from the timing circuit 5 and is stored in the memory 141 in step S2. At the same time, this digital information is also inputted to the comparing unit 143, by which the maximum value and the minimum value are determined as shown in step S3 and subsequent steps. Practically speaking, in step S3, $D_n - M_{max}$ (where, $M_{max}$ is the maximum value so far) is calculated and when the result of calculation is positive, namely, when the $D_n$ is the new maximum value, this $D_n$ is set to the maximum value $M_{max}$ in step S4. Subsequently, $D_n - M_{min}$ (where $M_{min}$ is the minimum value so far) is calculated in step S5. When the result of calculation is negative, namely, when the $D_n$ is the new minimum value, this $D_n$ is set to the minimum value $M_{min}$ in step S6. In the case where the minimum value $< D_n <$ the maximum value, no change is executed.

The value (of the counter) is increased by $+1$ in step S7 and a check is made to see if the value (of the counter) becomes n (data as much as one column) or not in step S8. Unless it is n, the data from the A/D converter 3 still remains, so that the process routine is returned to step S2 and the apparatus waits for the transmission of the next data. When the value of the counter is n, all of the data of one column have been sent, so that the comparing unit 143 sends the maximum value $M_{max}$ and the minimum value $M_{min}$ to the boundary value determiner 144. The boundary value determiner 144 obtains a boundary value SHV on the basis of these values in steps S9 and S10.

The boundary value SHV is determined to be the proper value between the maximum and minimum values $M_{max}$ and $M_{min}$ by the following equation.

$$SHV = M_{min} + (M_{max} - M_{min})/X \text{ (in step S9)}$$

Now, assuming that, for instance, $X=2$, the boundary value becomes the just intermediate value between the maximum and minimum values $M_{max}$ and $M_{min}$. The boundary value SHV determined by the boundary value determiner 144 is transmitted to the binarizing circuit 145.

Next, in steps S11 to S14, the digital information stored in the memory 141 in step S2 is sequentially read out under control of the controller 142 and is sent to the binarizing circuit and is binarized on the basis of the boundary value SHV (namely, $D_n = $ "0" when $D_n \geq SHV$, while $D_n = $ "1" when $D_n < SHV$), then these binary signals are sent to the output unit driver 146.

The output unit driver 146 drives the piezoelectric elements of the corresponding output units on the basis of the binarized data sent. When $D_n = 0$, there are pixels to be converted, so that the piezoelectric elements are driven. When $D_n = 1$, no pixel to be converted exists (white), so that no piezoelectric element is driven. Thus, the piezoelectric elements corresponding to the pattern which was read out by the sensor 1 vibrate, thereby enabling a blind person or the like to perceive these vibrations with the fingers or the like.

Although the vibrational outputs due to the piezoelectric elements are produced by the output units $6_0$ to $N_n$ in the foregoing description, if the output units $6_0$ to $N_n$ are constituted by LEDs, the pattern read out by the sensor 1 can be displayed like a matrix by the LEDs by an arbitrary size, so that a person with poor vision or the like can certainly perceive it.

Figure 2:
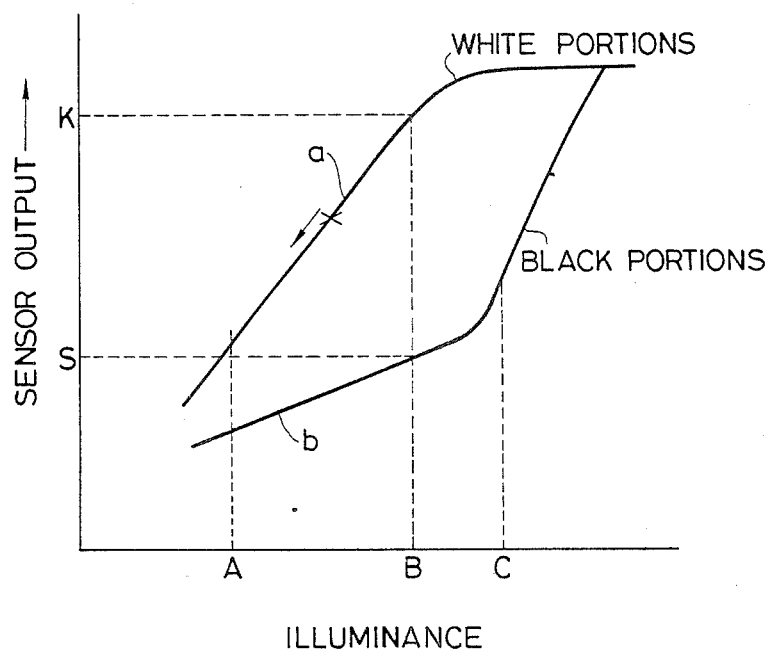
FIG. 2 is a graph showing the characteristic of a photo-sensor.

The output patterns by the output units in the foregoing two examples are derived in a manner such that, for instance, the data processing units $4_0$ to $4_n$ process the outputs for every column, respectively, as shown in FIG. 4. When the output of the photo-sensor 1 is considered, the particular regions where the signals of "1" and "0" are generated exist as shown respectively by the curves a and b in FIG. 2, so that a plurality of combinations of the outputs can be derived in dependence upon the detection states. For instance, in the case where the output of the photo-sensor 1 is K, the logic values consisting of two groups are outputted. As will be apparent from the drawing, when the illuminance is B and the output of the sensor is K and S, the contrast is largest and the image pattern can be easily read out. In the case where the camera apparatus 10 is placed to face the characters on the white paper, the signals "1" and "0" are generated. In the case where the camera apparatus 10 is separated from the paper or the camera apparatus 10 is placed to face the white paper without any character or the black pattern having a wide width, either "1" signal or "0" signal is outputted. The difference between the maximum and minimum values $M_{max}$ and $M_{min}$ of the outputs of the photo-sensor 1 is compared with a value k determined from the noise level, and at the same time the difference between the maximum value and K and the difference between the maximum value and S are obtained, thereby determining an output of a port P. By controlling the lamp using this output value, a stable sensor output is derived. The foregoing value k is automatically or fixedly determined from the noise level and its detailed explanation is omitted. This control is executed in step S15 of the flowchart of FIG. 6. Namely, when the conversion of the pattern of one column is completed, the controller 142 generates a start signal to the arithmetical unit 147, so that the arithmetical unit 147 executes the control of FIG. 7 from the maximum and minimum values obtained by the comparing unit 143. The operation of the arithmetical unit 147 will then be explained in detail hereinbelow with reference to FIG. 7.

Figure 7:
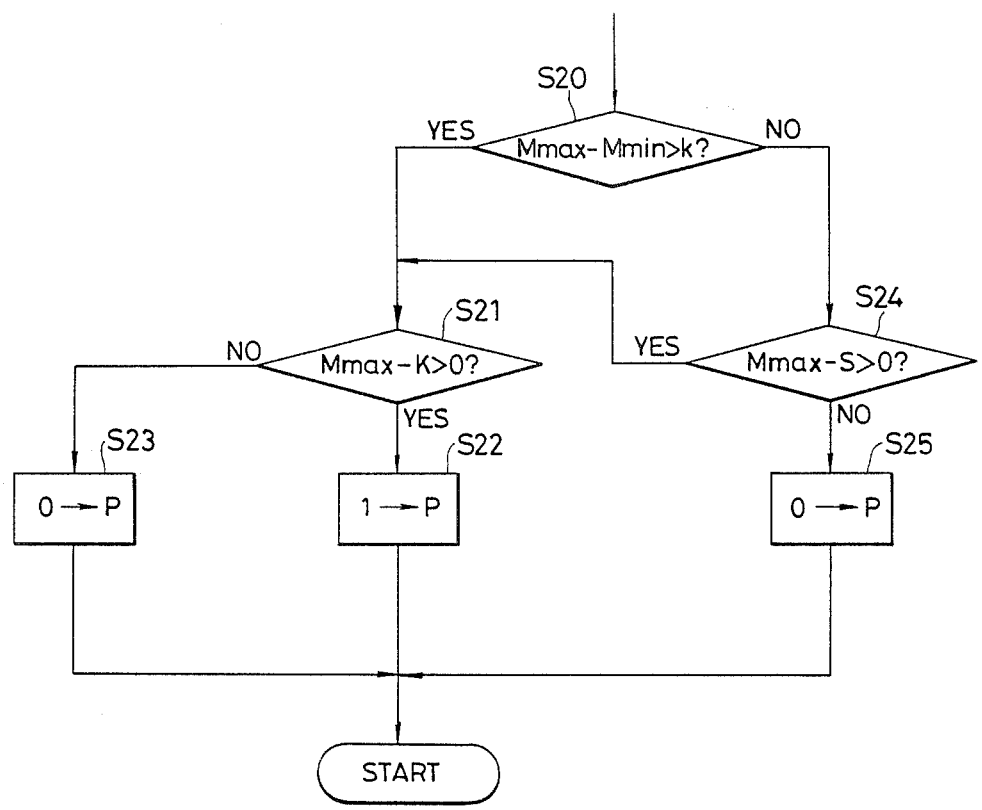
FIG. 7 is a flowchart showing another operation of the data processing unit of the embodiment.

In step S20 in FIG. 7, when the difference between the maximum and minimum values $M_{max}$ and $M_{min}$ is larger than k, the difference between the maximum value $M_{max}$ and K (output of the sensor) is checked in step S21. Thus, when the result of $M_{max}-K$ is positive, the output of the output port P is set to "1" (step S22) and when it is negative, the output is set to "0" (step S23). When the difference between the maximum and minimum values $M_{max}$ and $M_{min}$ is smaller than k, step S24 follows and the difference between the maximum value $M_{max}$ and S (refer to FIG. 2) is checked. Thus, when the result of $M_{max}-S$ is positive, the difference between the maximum value $M_{max}$ and K is further checked (step S21). On the contrary, when it is negative, the output of the output port P is set to "0" (step S25). The foregoing comparing operations are performed whenever the discrimination output of "1" or "0" of the sensor output of one column ends.

Next, the state whereby the quantity of light of the lamp is controlled by a light quantity control unit LL in the block diagram shown in FIG. 3 and by the output of the port P will be explained. In FIG. 3, R0 denotes a resistor connected to a node of resistors R1 and R2 to change the potential at this node; R3 is a resistor to apply the bias to a transistor T1; and D1 is a Zener diode to give the threshold value to a transistor T2. In this circuit, when the output of the output port P of the data processing unit is "0", the node potential of the resistors R1 and R2 drops, so that the bias to the transistor T2 becomes shallow (low) and the light quantity of a lamp L increases. On the contrary, when the output of the output port P is "1", namely, when it is at a high level, the node potential of the resistors R1 and R2 increases, so that the bias to the transistor T2 becomes high and the current from a power source Vb decreases and the light quantity of the lamp L decreases. Namely, the light quantity of the lamp L is controlled so as to suppress the output fluctuation of the photo-sensor 1.

The case where the control is made using a single point of K as a reference has been described in the above; however, the control can be also performed by setting the reference output to a value within a wide range.

As described above, according to the invention, even if the paper surface varies or the time change of the lamp or the like occurs, the output voltage of the photo-sensor is maintained to almost a constant value, so that stable operation can be performed even in case of a matter to be read out in which the difference between the signals "0" and "1" becomes inherently small. In addition, it is possible to provide a pattern converting apparatus having the stable output without considering the variation in characteristic of the lamp or fine control of the constant voltage circuit.

Figure 8:
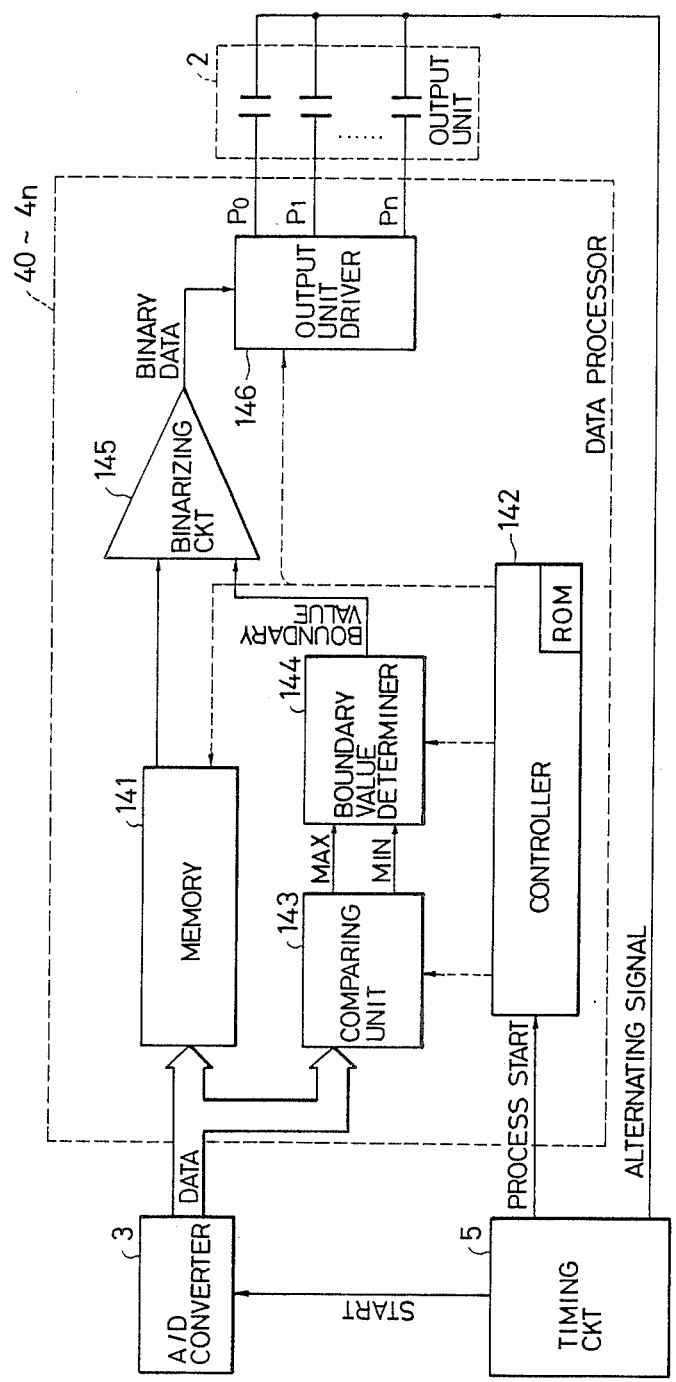
FIG. 8 is a block diagram showing another embodiment of the invention.

Next, there will be explained the case where the output signal of the sensor is outputted as the perceptible output instead of controlling the light quantity on the side of the sensor by converting the value of the light intensity into the proper digital value. In this case, an arrangement of the apparatus including the data processing units are substantially similar to that shown in FIG. 3 except that the light quantity control unit LL is unnecessary, while each data processing unit is similar to that in FIG. 4 and is shown in detail in FIG. 8. As compared with FIG. 4, the arithmetical unit 147 is omitted in FIG. 8, but the other arrangement is substantially the same as FIG. 4; therefore, its detailed description is omitted. In addition, the control flowchart based on FIG. 8 is also similar to that in FIG. 6 and its detailed description is omitted.

In the above explanation, the alternating signal is outputted to the output units $6_0$ to $N_n$ by the timing circuit 5 and the pattern is outputted due to this alternating signal. However, the output units may receive the binarized data from the binarizing circuit 145 in the data processing units $4_0$ to $4_n$ and the read-out pattern may be outputted.

Figure 9:
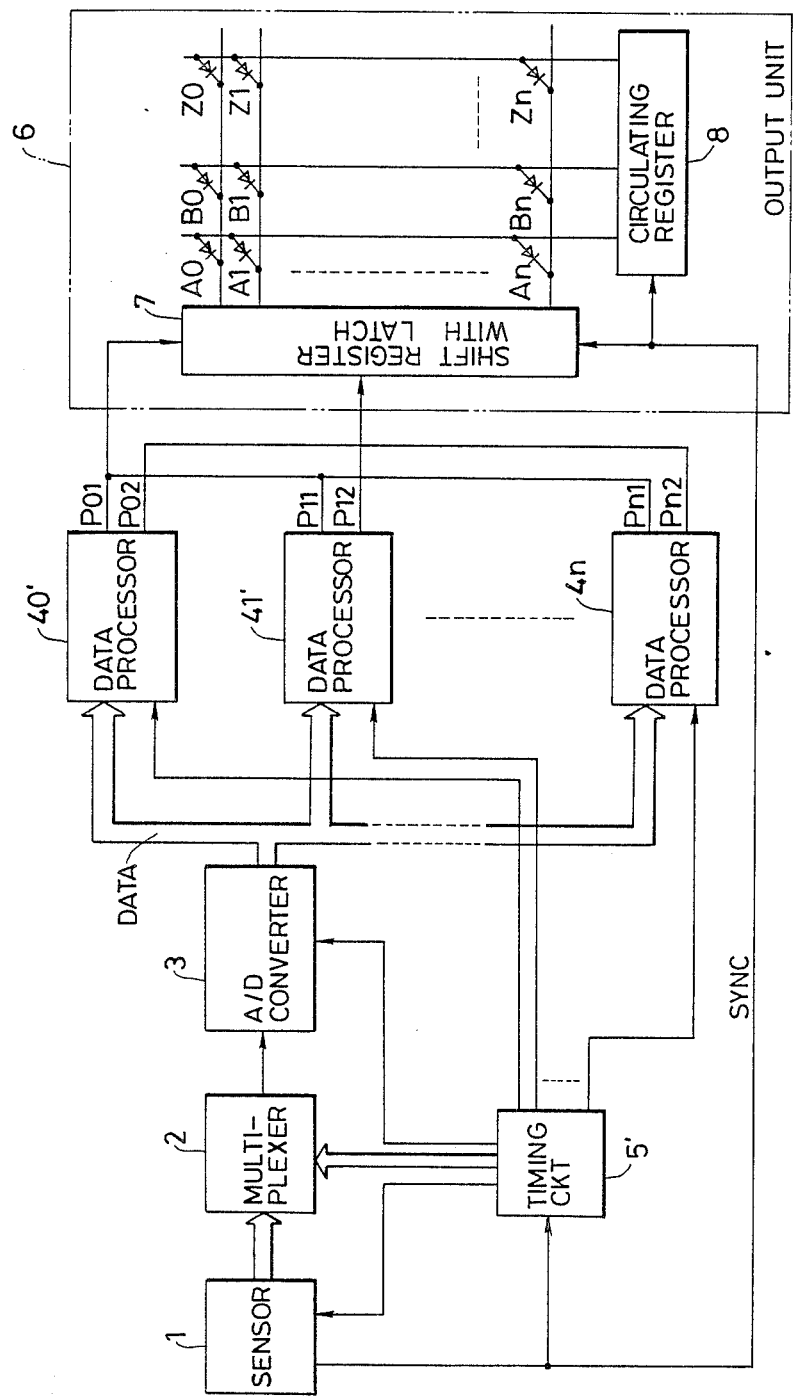
FIG. 9 is a block diagram showing the details of the data processing unit.

An example in this case is shown in FIG. 9.

In FIG. 9, the similar parts and components as those shown in FIG. 3 are designated by the same reference numerals. A timing circuit 5' is substantially similar to the timing circuit 5 in FIG. 3 excluding that no alternating signal is outputted. Data processing units $4_0'$ to $4_n'$ are also similar to those in FIG. 3 except that in place of the output unit driver 146 in FIG. 3, the binarized data from the binarizing circuit 145 and the binarized data transmission timing signal from the controller 142 are outputted to the outside (output unit 6 in FIG. 9).

Next, an arrangement and operation of the output unit 6 will be explained. In FIG. 9, a shift register 7 with latch reads outputs $P_{01}$ to $P_{n1}$ which are binarized data outputs from the data processing units in response to clock pulses based on outputs $P_{02}$ to $P_{n2}$ and transmits those outputs to a latch circuit synchronously with the SYNC signal from the sensor 1. A numeral 8 denotes a circulating register in which the signal of "1" is circulated and shifted synchronously with the SYNC signal. $A_0$ to $A_n$ and $B_0$ to $B_n$ and $Z_0$ to $Z_n$ represent LEDs.

Figure 6:
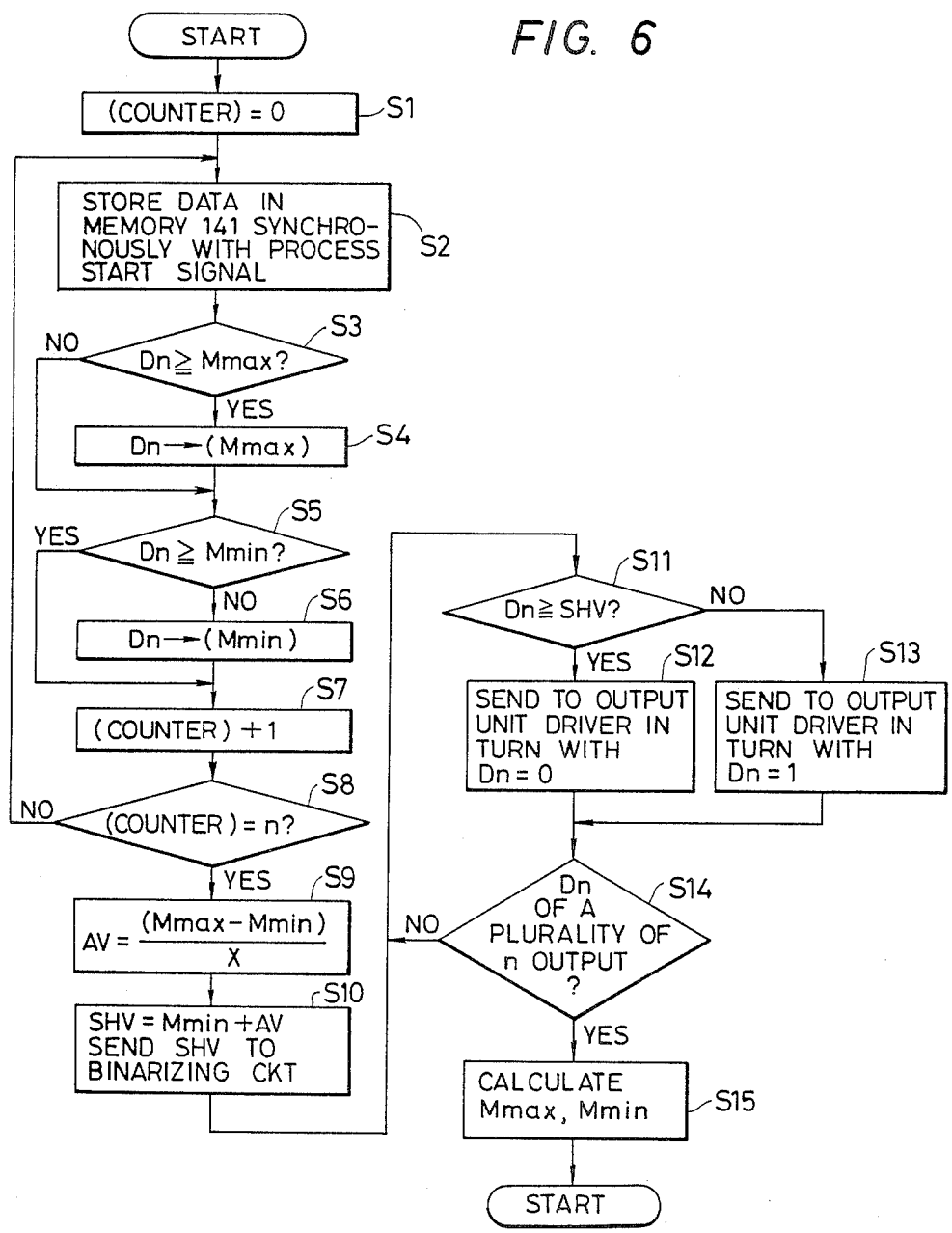
FIG. 6 is a flowchart showing the operation of the data processing unit of FIG. 4.
Figure 10:
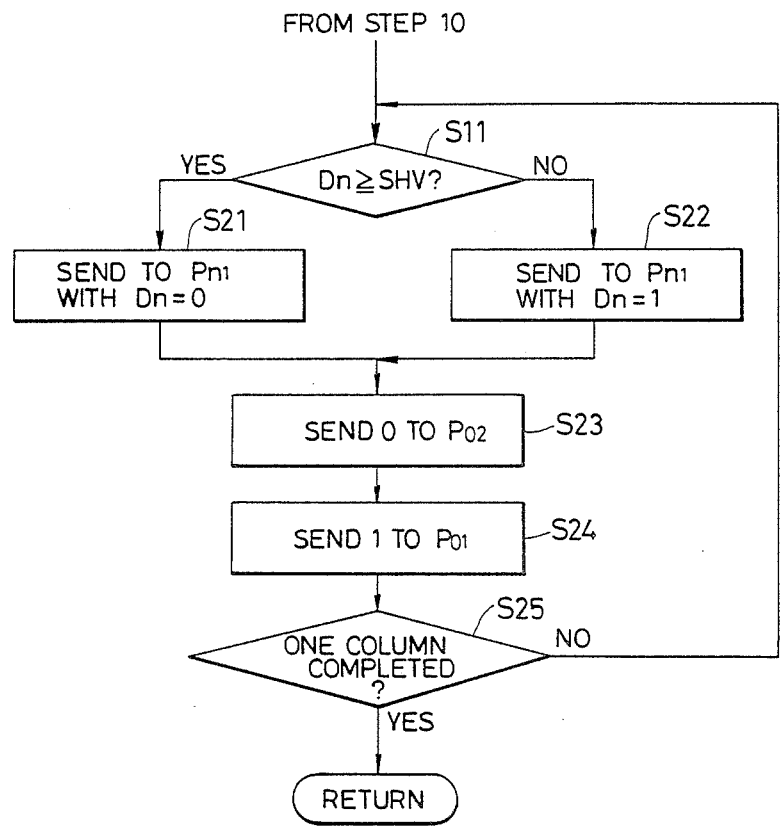
FIG. 10 is a flowchart showing the control of the output unit.

In the data output control from the data processing units to the output unit 6, the taking-in of the data from the A/D converter 3 and determination of the boundary value are substantially the same as those in steps S1 to S10 in FIG. 6 mentioned before except that the processes in step S11 and subsequent steps differ. These different processes are shown in a flowchart in FIG. 10.

The processes in steps S1 to S10 are performed in a similar manner as the data processes in FIG. 6 and thereafter step S11 follows. In step S11, the boundary value SHV by the binarizing circuit 145 and the digital information $D_n$ from the memory 1 are compared. When $D_n \geq SHV$, the $D_n$ is set to "0" in step S21. When $D_n < SHV$, the $D_n$ is set to "1" in step S22. Then, these values are outputted to the output ports $P_{01}$ to $P_{n1}$. The outputs $P_{02}$ to $P_{n2}$ are set to "0" in step S23 or to "1" in step S24 in order to generate clock signals to allow those outputs $P_{01}$ to $P_{n1}$ to be stored in the shift register 7 with latch.

Synchronously with the clock signals from the outputs $P_{02}-P_{n2}$, the outputs $P_{01}-P_{n1}$ at that time are stored in the shift register 7 with latch. Then, a check is made to see if the processes of the data of one column were completed or not in step S25. When the processes of the data of one column are not finished yet, the process routine is returned to step S11, while in the case where they have been finished, the process routine is returned to step S1.

When the binarized read information is stored in the shift register 7 with latch, the signals in the latch circuit are exchanged for every SYNC signal. On the other hand, the groups of $A_0-A_n$, $B_0-B_n$, ..., $Z_0-Z_n$ are sequentially selected for every SYNC signal by the output of the circulating register, so that the dynamic display due to the LEDs is performed.

Although an example whereby the display pattern is visually displayed by the LEDs has been described, the substantially same pattern can be outputted even if the piezoelectric elements are driven in place of the LEDs.

In addition, in the case where thermal heads are connected in place of the LEDs and a thermal print paper is moved in accordance with the movement of the sensor 1, characters or the like can be printed.

In the foregoing description, each of the data processing units $4_0$ to $4n$ has the arrangement shown in FIG. 4 and can be easily constituted as a one-chip LSI. The same shall apply to the data processing units $4_0$ to $4n'$. If the outputting to the output units is carried out using a microprocessor from the output ports thereof, a further high reliability will be derived.

On the other hand, the portions other than the output unit driver 146 of the data processing units $4_0$–$4n$ shown in FIG. 4 or of the data processing units $4_0$–$4n'$ shown in FIG. 9 can be all made common and may be integrally constituted. In addition, in the arrangement of FIG. 9, the data processing units $4_0$–$4n'$ can be replaced by a single microprocessor.

As described above, according to the present invention, it is possible to provide a pattern converting apparatus in which in case of reading graphic information and binarizing it, the boundary value is automatically set to a proper value without manually adjusting it and the graphic information can be outputted as the information which can be perceived by a human being. Thus, even a blind person or person with poor vision or the like can easily handle this apparatus without requiring any special training.

In particular, it is possible to provide a pattern converting apparatus which is fitted for a blind person by obtaining the output as the output information due to the mechanical vibration or which is suitable for a person with poor vision by deriving the output as the visual display information by enlarging it.

Figure 11:
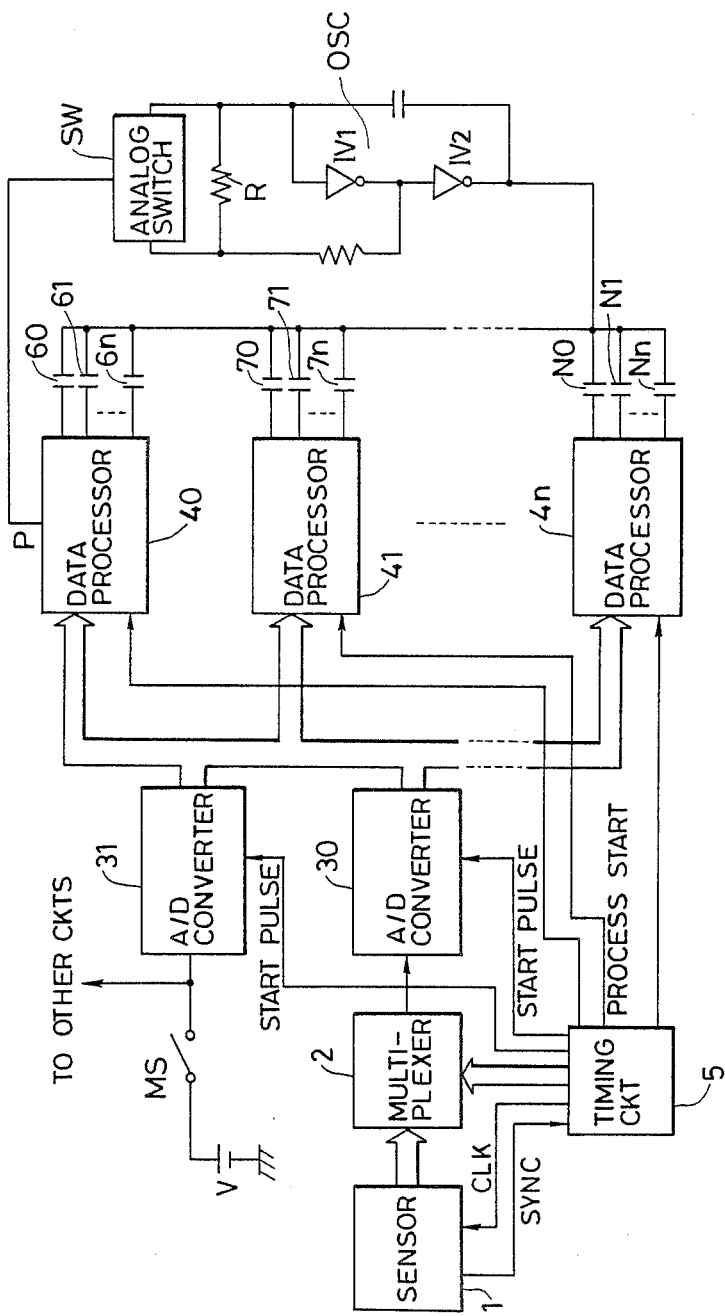
FIG. 11 is a block diagram in case of checking the power source voltage of the apparatus.

Next, there will be explained the case where the process similar to the A/D converting process for the foregoing image processes is performed and the power source voltage of the apparatus is checked. FIG. 11 shows an arrangement block diagram in this case, in which the similar parts and components as those shown in FIGS. 3 and 9 are designated by the same reference numerals. A different point from FIGS. 3 and 9 is that the apparatus of FIG. 11 further has a three state output circuit and includes an A/D converter 31 for converting the foregoing voltage V of the battery into the digital signal, a resistor R to determine the oscillating frequency, an analog switch SW for shortcircuiting both ends of the resistor R by the output "1" from the port P, etc. In the above arrangement, when the start pulse is generated from the timing circuit 5 at the timing after completion of the conversion of the pixels of one column, the A/D converter 31 converts the battery voltage to a digital value. This converted value and a predetermined comparison value are compared in the data processing units and when the voltage of the power source V becomes a value below a constant value, "1" is outputted to the output port P. Due to this output, the resistance of the analog switch SW becomes almost zero and the oscillating frequency of a CR oscillator OSC increases. The piezoelectric elements $6_0$–$6n$, ..., $N_0$–$Nn$ are driven at this increased oscillating frequency, so that the generation sound varies. On one hand, by inverting the outputs of "0" and "1" and applying these inverted outputs, the oscillating frequency decreases.

Figure 12:
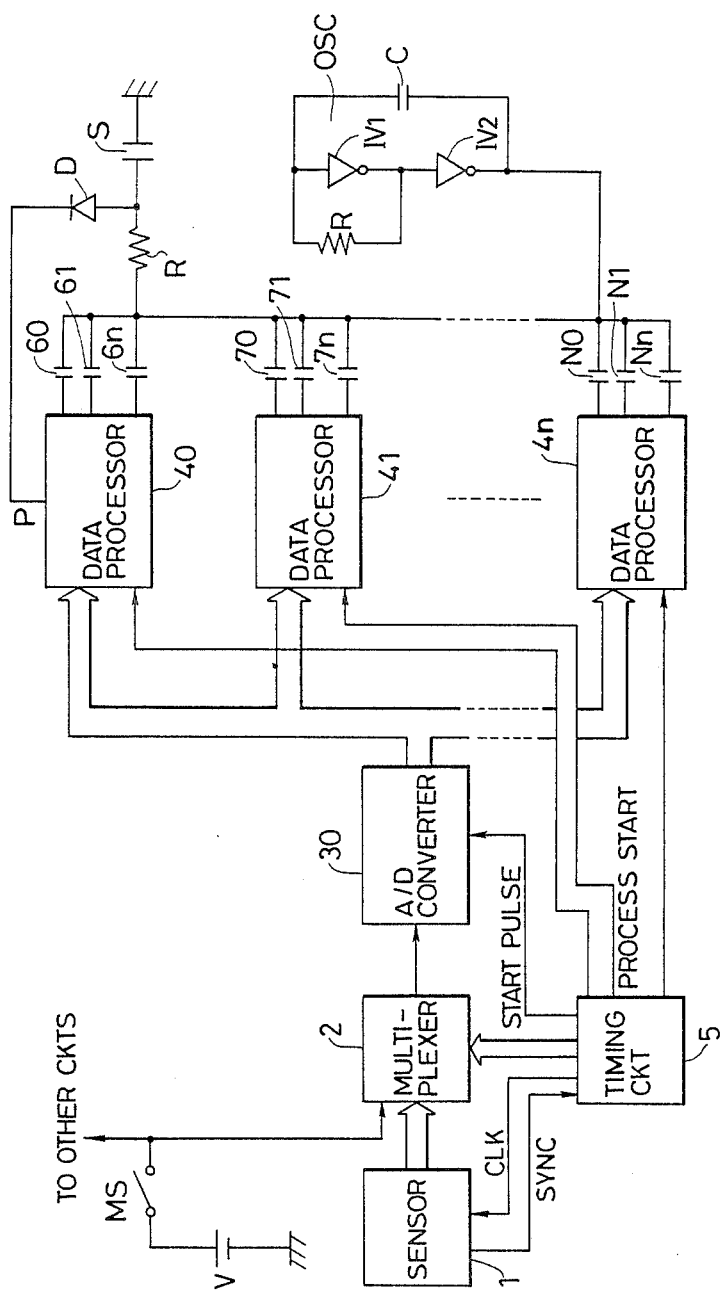
FIG. 12 is a block diagram showing still another embodiment of the invention.

FIG. 12 is a block diagram of another embodiment of the present invention, in which in place of the analog switch SW shown in FIG. 11, a diode D and a piezoelectric sounding element S which generates an acoustic sound due to the application of an alternating voltage are arranged. When "0" is outputted to the port P, the potential at a connecting point of the resistor R and piezoelectric acoustic sounding element S becomes the earth potential, so that the sounding element S is disconnected from the CR oscillator OSC consisting of the capacitor C, inverters $IV_1$ and $IV_2$, and resistor R. Thus, the generation of the sound is interrupted. On the contrary, when "1" is outputted to the port, the diode D is reverse biased and the connecting point is substantially disconnected from the port, so that the sounding element S generates the sound in accordance with the alternating voltage of the oscillator OSC. The value of the power source voltage V is supplied through the multiplexer 2 and is converted by the A/D converter 30 similarly to the output of the photo-sensor 1 and thereafter it is inputted to the data processing unit $4_0$.

In the foregoing arrangement, the difference between the digital value converted on the basis of the value of the power source voltage and a predetermined comparison value is obtained. When the result of comparison becomes below the predetermined value, "1" is outputted to the output port P, thereby allowing the alternating voltage to be applied to the sounding element S, so that the acoustic sound is generated.

Figure 13:
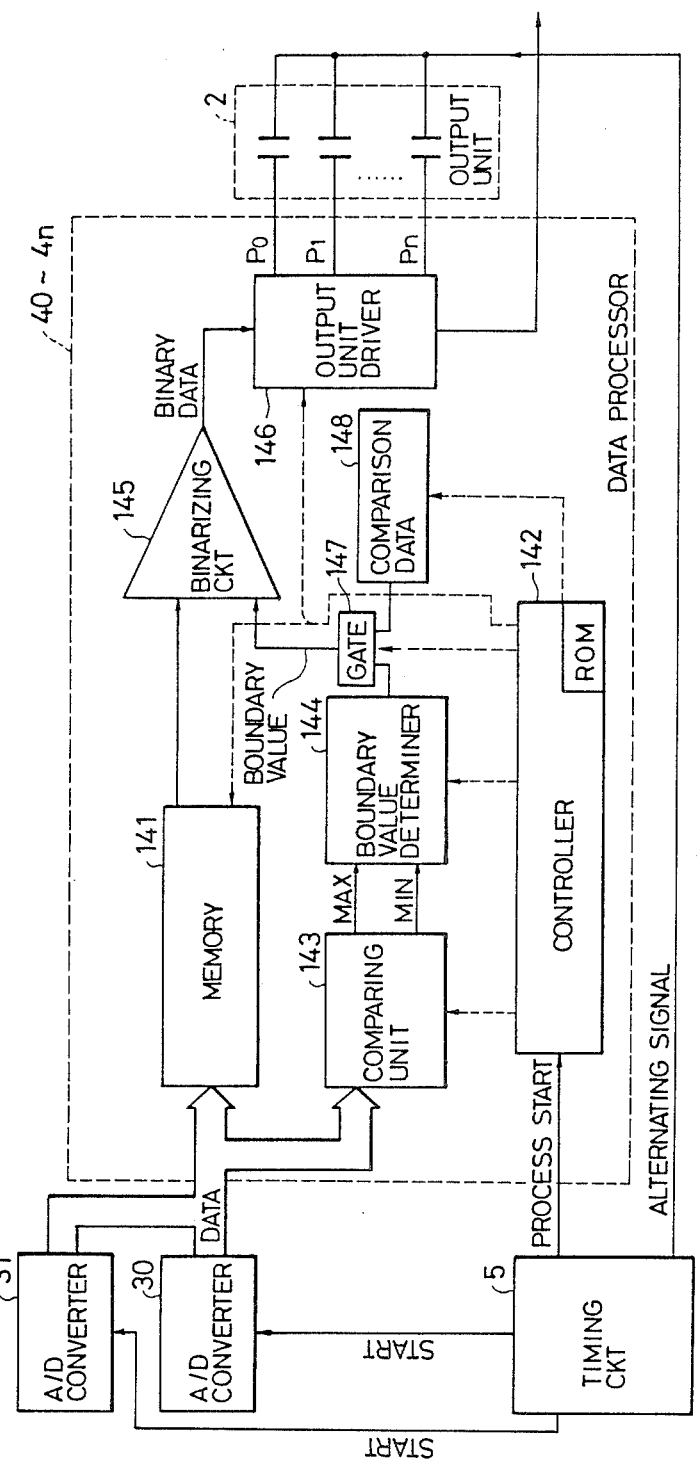
FIG. 13 is a block diagram showing the details of the data processing unit.

Next, FIG. 13 shows the details of the data processing units $4_0$–$4n$ relative to the pattern conversion and checking of the fluctuation of the power source voltage. The data processing units $4_0$ –$4n$ have the common arrangement. Although FIG. 13 is similar to FIGS. 4 and 8, an explanation will be again made hereinbelow. In the diagram, a numeral 141 denotes the memory to store the digital information from an A/D converter 30; 142 is the controller to control the overall data processing units; 143 is the comparing unit to detect the maximum value and the minimum value of the storage data from the A/D converter 30 into the memory 141; 144 is the boundary value determiner to determine the boundary value from the maximum and minimum values derived by the comparing unit 143; 145 is the binarizing circuit to binarize the digital information stored in the memory 141 using the boundary value from the boundary value determiner 144 as the reference; 146 is the output unit driver which serial-parallel converts the binarized digital signal from the binarizing circuit 145 and drives the corresponding output units; 147 is a gate which allows either of the boundary value and comparison value to pass through the binarizing circuit 145 in response to the signal from the controller; and 148 is a holding unit to hold the comparison value. This comparison value is the digital value responsive to the power source voltage necessary to normally drive the apparatus and is set by the controller 142.

The data processing control of the data processing units with the foregoing arrangement is substantially similar to that in FIG. 6; therefore, its detailed description is omitted. When the conversion of the pixels of one column is completed in step S14 in FIG. 6, step S15 follows and the controller 142 outputs a gate signal to the gate 147. Thus, the comparison value shown in FIG. 13 is inputted to the binarizing circuit 145 in place of the boundary value. On the other hand, the timing circuit 5 stops the outputting of a conversion command signal to the A/D converter 30 during this interval and outputs a start signal to instruct the conversion to the A/D converter 31. Therefore, the memory 141 takes in the voltage value of the power source V converted by the A/D converter 31. The binarizing circuit 145 obtains the difference between this voltage value and the comparison value held in the comparison value holding unit 148 and outputs the difference to the output unit driver 146. The output unit driver forms the output of "1" or "0" and generates it to the output port P and holds it.

In case of the embodiment shown in FIG. 12, the apparatus may be constituted in a manner such that the multiplexer 2 can select the power source V at the timing when the start pulse to instruct the conversion is outputted to the A/D converter 30, thereby enabling the voltage V to be applied to the A/D converter 30. In this case, only a single A/D converter may be used different from the case of FIG. 11.

As described above, according to the present invention, the power source voltage is automatically checked and the particular state is informed, so that the operability becomes easy. At the same time, a discrimination can be performed due to the different states instead of degrees of stimuli, so that there is an advantageous effect such that the objective and accurate informing can be performed.

Figure 14A:
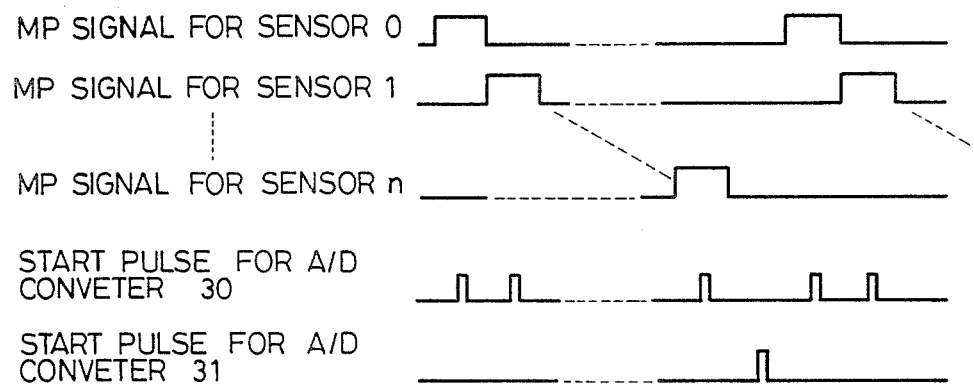
FIG. 14(a) and 14(b) show timecharts for a sensor and checking of the power source voltage.

Next, the foregoing conversion of the image pattern and checking of the power source voltage will be explained with reference to FIGS. 14(a) and 14(b). FIG. 14(a) shows a timechart for the change-over of the data in the block diagram of FIG. 11. FIG. 14(a) shows the timings when the sensor-0, sensor-1, ..., sensor-n in the sensor 1 are sequentially driven and the timing of the start pulse to the A/D converter 30 shown in FIG. 11. After the driving of one column of the sensor-0 to sensor-n was finished and before the driving of the next one column is started, namely, before the start pulse to the A/D converter 30 is outputted, the start pulse to the A/D converter 31 is generated as shown in the diagram, thereby checking the power source voltage.

Figure 14B:
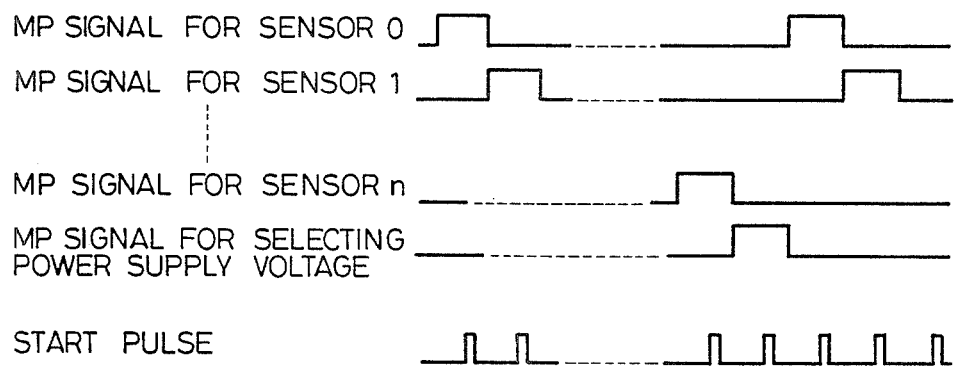

Similarly, FIG. 14(b) shows a timechart for the change-over of the data in the block diagram of FIG. 12. As will be obviously understood from the comparison between FIGS. 11 and 12, the A/D converter 30 is switched by the multiplexer (MP). Namely, after the driving of one column of the sensor-0 to sensor-n was finished, an MP signal to select the power source voltage (signal from the multiplexer) is outputted. In this case, the start pulse is likewise inputted to the A/D converter 30.

What is claimed is:

1. An image processing apparatus comprising:
   reading means including n sensor elements for reading an image pattern, wherein n is an integer having a value of at least 2;
   count means for counting output data output from each of said n sensor elements;
   maximum value determining means for determining whether a value of output data which is being counted by said count means is larger than values of output data which have been already counted;
   maximum value memory means for storing a value of output data being counted when said count means determines that a value of output data which is being counted by said count means is larger than values of output data which have been already counted;
   minimum value determining means for determining whether a value of output data which is being counted by said count means is smaller than values of output data which have been already counted;
   minimum value memory means for storing a value of output data being counted when said count means determines that a value of output data which is being counted by said count means is smaller than values of output data which have been already counted;
   boundary value determining means for determining a boundary value in response to both a maximum value stored in said maximum value memory means and a minimum value stored in said minimum value memory means after said count means counts n output data;
   converting means for converting each of said n output data to binary digital data by comparing output data from each of said sensor elements with the boundary value output from said boundary value determining means; and
   control means for controlling said reading means such that binary digital data from said converting means can be stabilized in response to said binary digital data from said converting means.

2. An image processing apparatus according to claim 1, wherein said reading means has a lamp for illuminating the image pattern and a sensor for converting the light reflected from said image pattern into an electrical signal and said control means controls a quantity of light of said lamp.

3. An image processing apparatus according to claim 1, further comprising lighting means for lighting said image pattern, wherein each of said plurality of sensor elements comprises a photoelectric converting element.

4. An image processing apparatus according to claim 1, wherein said plurality of sensor elements of said reading means are arranged in the form of one or more lines and said boundary value determining means determines the boundary value for each of said lines.

5. An image processing apparatus comprising:
   reading means including n sensor elements for reading an image pattern, wherein n is an integer having a value of at least 2;
   count means for counting output data output from each of said n sensor elements;
   maximum value determining means for determining whether a value of output data which is being counted by said count means is larger than values of output data which have been already counted;
   maximum value memory means for storing a value of output data being counted when said count means determines that a value of output data which is being counted by said count means is larger than values of output data which have been already counted;
   minimum value determining means for determining whether a value of output data which is being counted by said count means is smaller than values of output data which have been already counted;
   minimum value memory means for storing a value of output data being counted when said count means determines that a value of output data which is being counted by said count means is smaller than values of output data which have been already counted;
   boundary value determining means for determining a boundary value in response to both a maximum value stored in said maximum value memory means and a minimum value stored in said minimum value memory means after said count means counts n output data;

converting means for converting each of said n output data to binary digital data by comparing output data from each of said sensor elements with the boundary value output from said boundary value determining means; and informing means for outputting said binary digital data from said converting means for tactile perception.

6. An image processing apparatus according to claim 5, wherein said informing means converts the binary digital data from said converting means to mechanical vibration, thereby enabling said binary digital data to be informed.

7. An image processing apparatus according to claim 5, wherein said informing means converts the image pattern to graphic information on the basis of said binary digital data and displays said graphic information.

8. An image processing apparatus comprising:

reading means including n sensor elements for reading an image pattern, wherein n is an integer having a value of at least 2;

memory means for storing said image pattern read by said reading means;

count means for counting output data output from each of said n sensor elements;

maximum value determining means for determining whether a value of output data which is being counted by said count means is larger than values of output data which have been already counted;

maximum value memory means for storing a value of output data being counted when said count means determines that a value of output data which is being counted by said count means is larger than values of output data which have been already counted;

minimum value determining means for determining whether a value of output data which is being counted by said count means is smaller than values of output data which have been already counted;

minimum value memory means for storing a value of output data being counted when said count means determines that a value of output data which is being counted by said count means is smaller than values of output data which have been already counted;

boundary value determining means for determining a boundary value in response to both a maximum value stored in said maximum value memory means and a minimum value stored in said minimum value memory means after said count means counts n output data;

converting means for converting each of said output data to binary digital data by comparing output data from each of said sensor elements with the boundary value output from said boundary value determining means; and control means for controlling said reading means in response to said binary digital data from said converting means.

9. An image processing apparatus according to claim 8, further comprising:

informing means for outputting said binary digital data from said converting means for tactile perception.

10. An imaging processing apparatus according to clam 9, wherein said informing means converts the binary digital data from said converting means to mechanical vibration.

11. An image processing apparatus according to claim 9, wherein said information means converts the image pattern to graphic information on the basis of said binary digital data and displays said graphic information.

* * * * *

UNITED STATES PATENT AND TRADEMARK OFFICE
CERTIFICATE OF CORRECTION

PATENT NO. : 4,972,501

DATED : November 20, 1990

INVENTOR(S) : Sakae Horyu

It is certified that error appears in the above-identified patent and that said Letters Patent is hereby corrected as shown below:

<u>Figure 14(a)</u>
    "CONVETER" (both occurrences) should read --CONVERTER--.

<u>COLUMN 3</u>
    Line 2, change "an" (second occurrence) to --in--.

<u>COLUMN 4</u>
    Line 37, change "sensor-n" to --sensor-n.--.

<u>COLUMN 14</u>
    Line 30, change "imaging processing apparatus" to --image processing apparatus--.

Line 35, change "information means" to --informing means--.

Signed and Sealed this

Thirtieth Day of June, 1992

*Attest:*

DOUGLAS B. COMER

*Attesting Officer*      *Acting Commissioner of Patents and Trademarks*